(12) United States Patent
Sato (10) Patent No.: US 12,334,122 B2
(45) Date of Patent: Jun. 17, 2025

(54) DISK DEVICE WITH RAMP MECHANISM

(71) Applicants: Kabushiki Kaisha Toshiba, Tokyo (JP); Toshiba Electronic Devices & Storage Corporation, Tokyo (JP)

(72) Inventor: Yuki Sato, Ota Tokyo (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 0 days.

(21) Appl. No.: 18/461,944

(22) Filed: Sep. 6, 2023

(65) Prior Publication Data

US 2024/0321292 A1 Sep. 26, 2024

(30) Foreign Application Priority Data

Mar. 24, 2023 (JP) ................. 2023-048331

(51) Int. Cl.
*G11B 5/54* (2006.01)
*G11B 5/012* (2006.01)
*G11B 5/02* (2006.01)
*G11B 5/105* (2006.01)
*G11B 5/48* (2006.01)
*G11B 5/55* (2006.01)
*G11B 21/22* (2006.01)

(52) U.S. Cl.
CPC ............ *G11B 5/012* (2013.01); *G11B 5/02* (2013.01); *G11B 5/105* (2013.01); *G11B 5/4853* (2013.01); *G11B 5/54* (2013.01); *G11B 5/5534* (2013.01); *G11B 21/22* (2013.01)

(58) Field of Classification Search
None
See application file for complete search history.

(56) References Cited

U.S. PATENT DOCUMENTS

| | | | | |
|---|---|---|---|---|
| 5,973,886 A * | 10/1999 | Khuu | ............... | G11B 17/043 |
| 6,369,988 B1 * | 4/2002 | Yoshida | ............... | G11B 5/54 |
| 6,487,051 B1 * | 11/2002 | Koyanagi | ............... | G11B 5/54 |
| 6,690,548 B2 * | 2/2004 | Koyanagi | ............... | G11B 21/22 |
| 6,927,943 B1 * | 8/2005 | McGrath | ............... | G11B 5/54 |
| 8,169,747 B2 | 5/2012 | Seki et al. | | |
| 9,536,552 B1 * | 1/2017 | Chen | ............... | G11B 21/22 |

(Continued)

FOREIGN PATENT DOCUMENTS

JP 2007095216 A * 4/2007
JP 2010-238312 A 10/2010

*Primary Examiner* — William J Klimowicz
(74) *Attorney, Agent, or Firm* — Kim & Stewart LLP (57) ABSTRACT

According to one embodiment, a disk device includes a magnetic disk, a magnetic head, a suspension, a ramp mechanism, a housing, and a screw. The suspension holds the magnetic head and moves between a load position and an unload position. The ramp mechanism includes a ramp member that holds the suspension at the unload position, and a cylindrical member with a through hole, being fixed to the ramp member. The housing includes a first support surface with a screw hole supporting the cylindrical member. The screw includes a screw head and a screw shaft fitted into the screw hole through the through hole. The screw holds the cylindrical member between the screw head and the first support surface. A contact area between the cylindrical member and the housing is set to larger than a contact area between the cylindrical member and the screw head.

15 Claims, 6 Drawing Sheets

(56) References Cited

U.S. PATENT DOCUMENTS

| | | | | |
|---|---|---|---|---|
| 11,955,149 B1* | 4/2024 | Hasegawa | ............... | G11B 21/22 |
| 2005/0213254 A1* | 9/2005 | Okutomi | ................... | G11B 5/54 |
| 2006/0256478 A1* | 11/2006 | Hayakawa | ............. | G11B 21/22 |
| 2008/0037176 A1* | 2/2008 | Matsuda | ................... | G11B 5/54 |
| 2009/0213499 A1 | 8/2009 | Yamamoto et al. | | |
| 2009/0290258 A1 | 11/2009 | Matsuda et al. | | |
| 2024/0096353 A1* | 3/2024 | Hasegawa | ............... | G11B 21/22 |

* cited by examiner

DISK DEVICE WITH RAMP MECHANISM

CROSS-REFERENCE TO RELATED APPLICATIONS

This application is based upon and claims the benefit of priority from Japanese Patent Application No. 2023-048331, filed on Mar. 24, 2023, the entire contents of which are incorporated herein by reference.

FIELD

Embodiments described herein relate generally to a disk device.

BACKGROUND

Disk devices such as a hard disk drive (HDD) typically include, for example, magnetic disks, magnetic heads, suspensions, and a ramp mechanism. The magnetic heads are held by the corresponding suspensions. Each of the suspensions rotates between a load position where the magnetic head is located on the magnetic disk surface and an unload position where the suspension is held by the ramp mechanism. The ramp mechanism is attached to a housing with, for example, a screw.

To fix the ramp mechanism to the housing with a screw, the screw is elastically deformed in a twisted manner. Thus, elastic recovery of the screw may cause the ramp mechanism to be unintentionally rotated from a desired position.

DETAILED DESCRIPTION

In general, according to one embodiment, a disk device includes a magnetic disk, a magnetic head, a suspension, a ramp mechanism, a housing, and a screw. The magnetic disk includes a recording surface. The magnetic head is configured to read and write information from and to the magnetic disk. The suspension is configured to hold the magnetic head and to move between a load position where the magnetic head is located on the recording surface and an unload position where the magnetic head is located away from the recording surface. The ramp mechanism includes a ramp member configured to hold the suspension at the unload position, and a cylindrical member with a through hole, being fixed to the ramp member. The housing includes a first support surface with a screw hole supporting the cylindrical member. The housing accommodates the magnetic disk, the magnetic head, the suspension, and the ramp mechanism. The screw includes a screw head, and a screw shaft extending from the screw head to be fitted into the screw hole through the through hole. The screw holds the cylindrical member between the screw head and the first support surface. A contact area between the cylindrical member and the housing is set to larger than a contact area between the cylindrical member and the screw head.

First Embodiment

Hereinafter, a first embodiment is described with reference to FIGS. 1 to 4. Note that, in the present specification, components according to embodiments and descriptions of the components may be described in a plurality of expressions. The components and the descriptions thereof are examples and are not limited by the expression of the present specification. The components may also be identified with names different from those herein. In addition, the component may be described by an expression different from the expression in the present specification.

Figure 1:
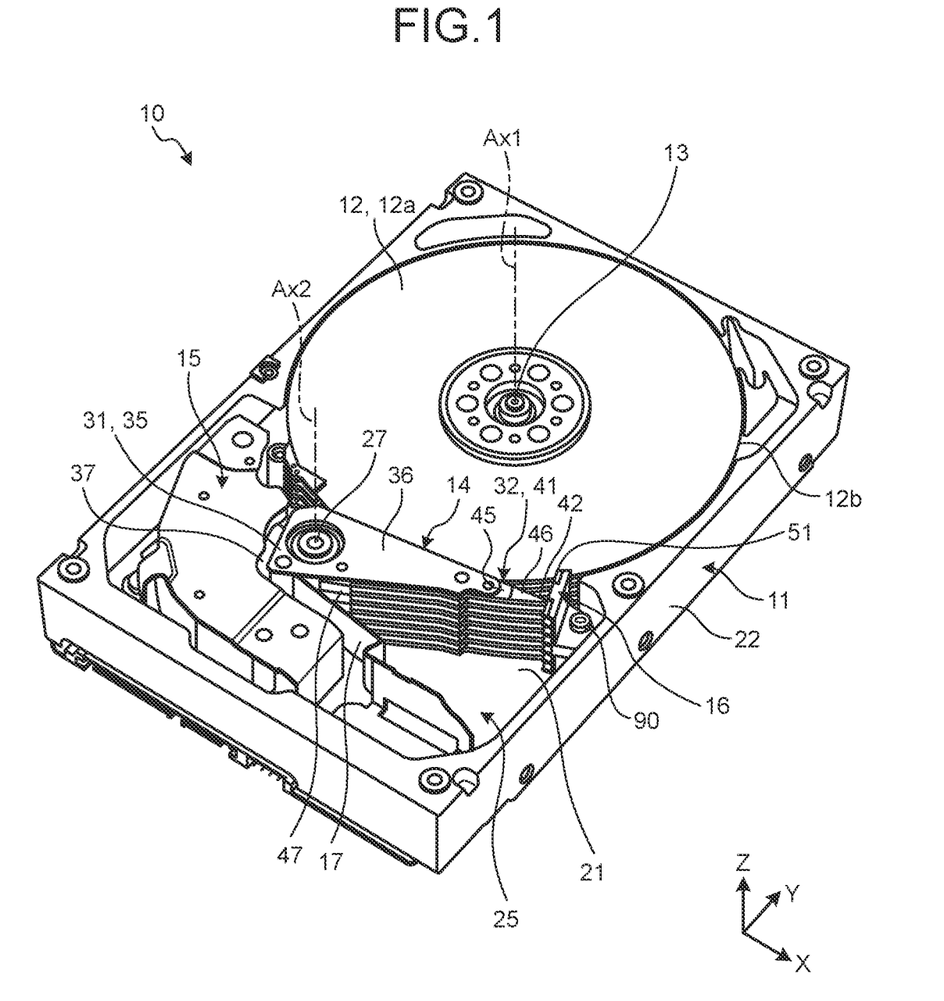
FIG. 1 is an exemplary perspective view illustrating an HDD according to a first embodiment.

FIG. 1 is an exemplary perspective view illustrating a hard disk drive (HDD) 10 according to the first embodiment. The HDD 10 is an example of a disk device and may also be referred to as an electronic device, a storage device, an external storage device, or a magnetic disk device.

As illustrated in the drawings, in the present specification, an X axis, a Y axis, and a Z axis are defined for convenience. The X axis, the Y axis, and the Z axis are orthogonal to each other. The X axis is provided along the width of the HDD 10. The Y axis is provided along the length of the HDD 10. The Z axis is provided along the thickness of the HDD 10.

Furthermore, in the present specification, an X direction, a Y direction, and a Z direction are defined. The X direction is a direction along the X axis and includes a +X direction indicated by an arrow of the X axis and a −X direction which is an opposite direction of the arrow of the X axis. The Y direction is a direction along the Y axis and includes a +Y direction indicated by an arrow of the Y axis and a −Y direction which is an opposite direction of the arrow of the Y axis. The Z direction is a direction along the Z axis and includes a +Z direction indicated by an arrow of the Z axis and a −Z direction which is an opposite direction of the arrow of the Z axis.

As illustrated in FIG. 1, the HDD 10 includes a housing 11, a plurality of magnetic disks 12, a spindle motor 13, a head stack assembly (HSA) 14, a voice coil motor (VCM) 15, a ramp load mechanism (ramp mechanism) 16, and a flexible printed circuit board (FPC) 17. The housing 11 may also be referred to as a base.

The housing 11 is made of, for example, a metal material such as an aluminum alloy. The housing 11 has a rectangular parallelepiped box shape extending in the Y direction and opened in the +Z direction. The housing 11 includes a bottom wall 21 and a peripheral wall 22.

The bottom wall 21 has a substantially rectangular (quadrangular) plate shape extending along the X-Y plane. The peripheral wall 22 protrudes substantially in the +Z direction from the edge of the bottom wall 21 and has a substantially rectangular frame shape. The bottom wall 21 and the peripheral wall 22 are integrally formed.

The housing 11 has an inner chamber 25 open in the +Z direction. The inner chamber 25 is formed, defined, or partitioned, for example, by the bottom wall 21 and the peripheral wall 22. Thus, the peripheral wall 22 surrounds the inner chamber 25. The housing 11 accommodates the magnetic disks 12, the spindle motor 13, the HSA 14, the VCM 15, and the ramp mechanism 16 in the inner chamber 25.

One or more covers are attached to the end portion of the peripheral wall 22 in the +Z direction. The cover closes the inner chamber 25, for example, in a substantially airtight manner. The inner chamber 25 is filled with a gas different from air. For example, the inner chamber 25 is filled with a low density gas having a density lower than that of air, an inert gas having low reactivity, or the like. In the present embodiment, the inner chamber 25 is filled with helium. Note that the inner chamber 25 may be filled with another fluid. Further, the inner chamber 25 may be maintained at vacuum, low pressure close to vacuum, or negative pressure lower than atmospheric pressure.

The plurality of magnetic disks 12 is arranged along the X-Y plane. The diameter of the magnetic disk 12 is, for example, 3.5 inches, but is not limited to this example. Each of the plurality of magnetic disks 12 includes, for example, at least one recording surface 12a and an outer edge 12b.

The recording surface 12a is provided on at least one of the upper surface and the lower surface of the magnetic disk 12. In other words, each of the plurality of recording surfaces 12a is a surface of the magnetic disk 12 facing substantially in the +Z direction or a surface of the magnetic disk 12 facing substantially in the −Z direction. The recording surface 12a is a substantially flat surface extending along the X-Y plane. A magnetic recording layer of the magnetic disk 12 is provided on the recording surface 12a. Note that the magnetic recording layer may not be provided on a portion of the recording surface 12a. The outer edge 12b is an outer peripheral surface of the magnetic disk 12.

The spindle motor 13 is attached to the bottom wall 21 of the housing 11. Note the spindle motor 13 may be disposed at another position. The plurality of magnetic disks 12 is attached to the spindle motor 13.

The plurality of magnetic disks 12 is arranged at intervals in the Z direction. For example, a spacer is disposed between the plurality of magnetic disks 12. The spindle motor 13 includes a hub that supports the plurality of magnetic disks 12. The plurality of magnetic disks 12 is held by the hub of the spindle motor 13 by, for example, a clamp spring.

The spindle motor 13 rotates the plurality of magnetic disks 12 about a first rotation axis Ax1. The first rotation axis Ax1 is a virtual axis extending substantially in the Z direction. That is, the first rotation axis Ax1 extends in a direction orthogonal to (intersecting) the recording surface 12a.

The first rotation axis Ax1 is the center of rotation by the spindle motor 13, and is also the axis of the magnetic disk 12 and the hub of the spindle motor 13. Note that the axis of the magnetic disk 12 in a disk shape and the axis of the hub of the spindle motor 13 may be different from the center of rotation by the spindle motor 13.

The HSA 14 is rotatably supported by a support shaft 27 disposed at a position separated from the magnetic disk 12. The support shaft 27 extends, for example, substantially in the +Z direction from the bottom wall 21 of the housing 11.

The HSA 14 can rotate about a second rotation axis Ax2 separated from the first rotation axis Ax1. The second rotation axis Ax2 is a virtual axis extending substantially in the Z direction. Therefore, the first rotation axis Ax1 and the second rotation axis Ax2 are arranged substantially in parallel. The second rotation axis Ax2 is, for example, the center of rotation of the HSA 14 and is also the axis of the support shaft 27.

The HSA 14 includes a carriage 31 and a plurality of head gimbal assemblies (HGA) 32. The carriage 31 includes an actuator block 35, a plurality of arms 36, and a coil holder 37.

The actuator block 35, the plurality of arms 36, and the coil holder 37 are integrally formed of, for example, aluminum. Note that the materials of the actuator block 35, the arm 36, and the coil holder 37 are not limited to this example.

The actuator block 35 is rotatably supported by the support shaft 27 via a bearing, for example. The plurality of arms 36 protrude from the actuator block 35 in a direction orthogonal to the second rotation axis Ax2. Note that the HSA 14 may be divided, and the arm 36 may protrude from each of the plurality of actuator blocks 35.

The plurality of arms 36 is arranged at intervals in the Z direction. Each of the arms 36 has a plate shape to enter a gap between the adjacent magnetic disks 12. The plurality of arms 36 extend substantially in parallel.

The coil holder 37 protrudes from the actuator block 35 and is located opposite the arm 36. The coil holder 37 holds the voice coil of the VCM 15. The VCM 15 includes the voice coil, a pair of yokes, and a magnet provided on the yoke.

Each of the plurality of HGAs 32 is attached to one distal end of the corresponding arm 36 and protrudes from the arm 36. As a result, the plurality of HGAs 32 are arranged at intervals in the Z direction. Each of the plurality of HGAs 32 includes a suspension 41 and a magnetic head 42. The magnetic head 42 may also be referred to as a slider.

The suspension 41 includes a base plate 45, a load beam 46, and a flexure 47. The base plate 45 and the load beam 46 are made of, for example, stainless copper. Note that the materials of the base plate 45 and the load beam 46 are not limited to this example. The base plate 45 has a plate shape and is attached to the distal end portion of the arm 36.

The load beam 46 is attached to the distal end portion of the base plate 45 and protrudes from the base plate 45 in a direction orthogonal to the second rotation axis Ax2. The load beam 46 is thinner than the base plate 45 and has a plate shape extending along the X-Y plane.

The flexure 47 has an elongated belt shape. Note that the shape of the flexure 47 is not limited to this example. The flexure 47 is, for example, a stacked plate including a metal plate (backing layer) made of stainless copper or the like, an insulating layer formed on the metal plate, a conductive layer formed on the insulating layer and constituting a plurality of sets of wiring (wiring patterns), and a protective layer (insulating layer) covering the conductive layer.

The flexure 47 is attached to the base plate 45 and the load beam 46. The flexure 47 includes a displaceable gimbal (elastic support) at one end above the load beam 46. The magnetic head 42 is mounted on the gimbal. In other words, the suspension 41 holds the magnetic head 42. The flexure 47 is electrically connected to the magnetic head 42.

The magnetic head 42 records and reproduces information on and from the recording surface 12a of the magnetic disk 12. In other words, the magnetic head 42 reads and writes information from and to the magnetic disk 12. The magnetic head 42 may incorporate a device that emits laser light or microwaves to the magnetic disk 12.

The VCM 15 rotates the HSA 14 about the second rotation axis Ax2 and places the HSA 14 at a desired position. That is, the VCM 15 moves the suspension 41 and the magnetic head 42 around the second rotation axis Ax2. When the magnetic head 42 moves to the outermost periphery of the magnetic disk 12 by the rotation of the HSA 14 by the VCM 15, the ramp mechanism 16 holds the magnetic head 42 at a position separated from the magnetic disk 12.

One end portion of the FPC 17 is connected to the flexure 47. The other end portion of the FPC 17 is connected to a substrate disposed outside the housing 11 via a connector provided in the housing 11, for example. For example, a controller that controls the entire HDD 10 and an interface connector connected to a host computer are mounted on the substrate. The substrate is electrically connected to the magnetic head 42 via the FPC 17 and the flexure 47.

Figure 2:
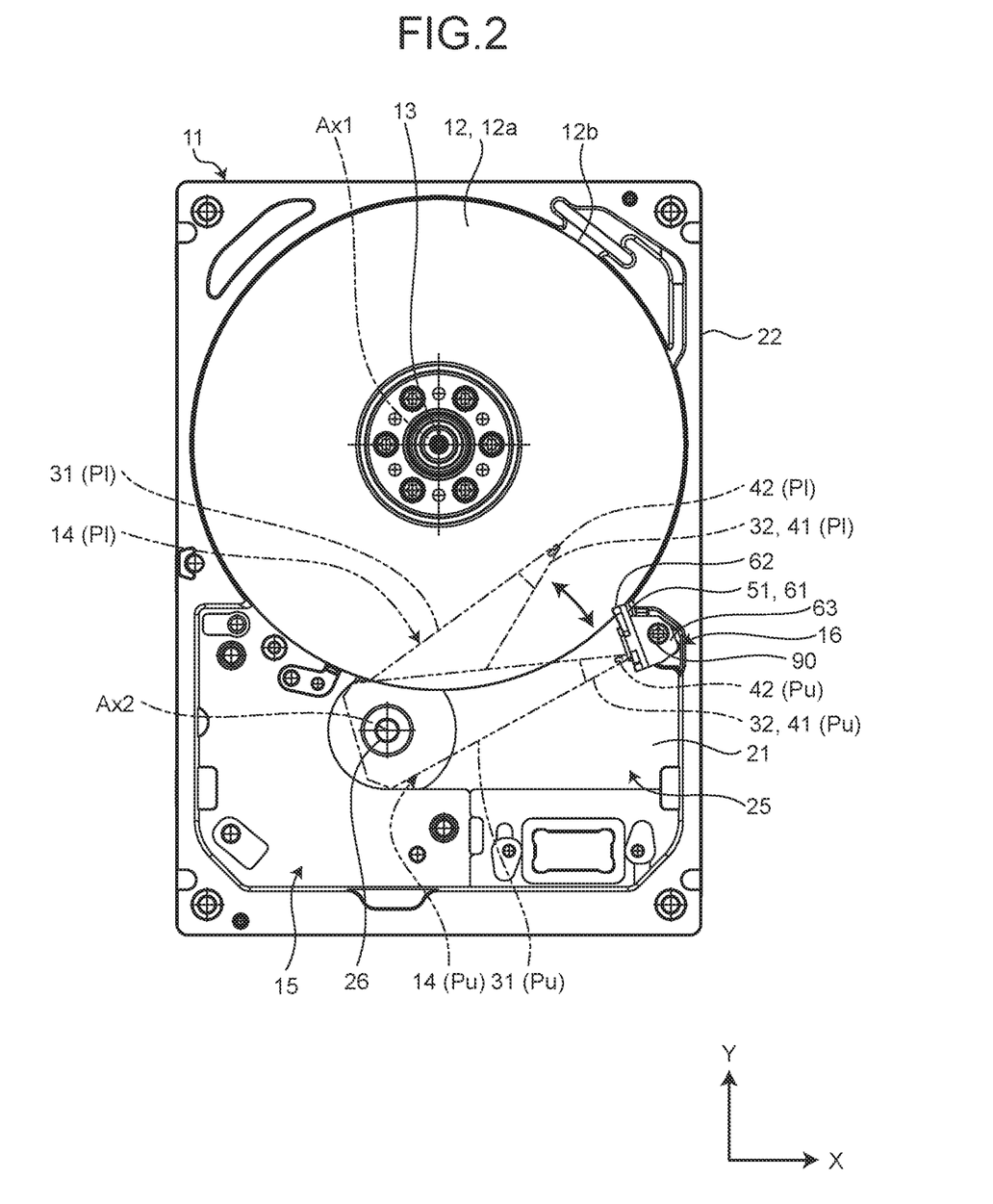
FIG. 2 is an exemplary plan view illustrating a housing, a magnetic disk, and a ramp mechanism of the first embodiment.

FIG. 2 is an exemplary plan view illustrating the housing 11, the magnetic disk 12, and the ramp mechanism 16 of the first embodiment. As illustrated in FIG. 2, the ramp mechanism 16 is disposed at a position separated from the first rotation axis Ax1 in a direction orthogonal to the first rotation axis Ax1. Further, the ramp mechanism 16 is separated from the second rotation axis Ax2 in a direction orthogonal to the second rotation axis Ax2.

Figure 3:
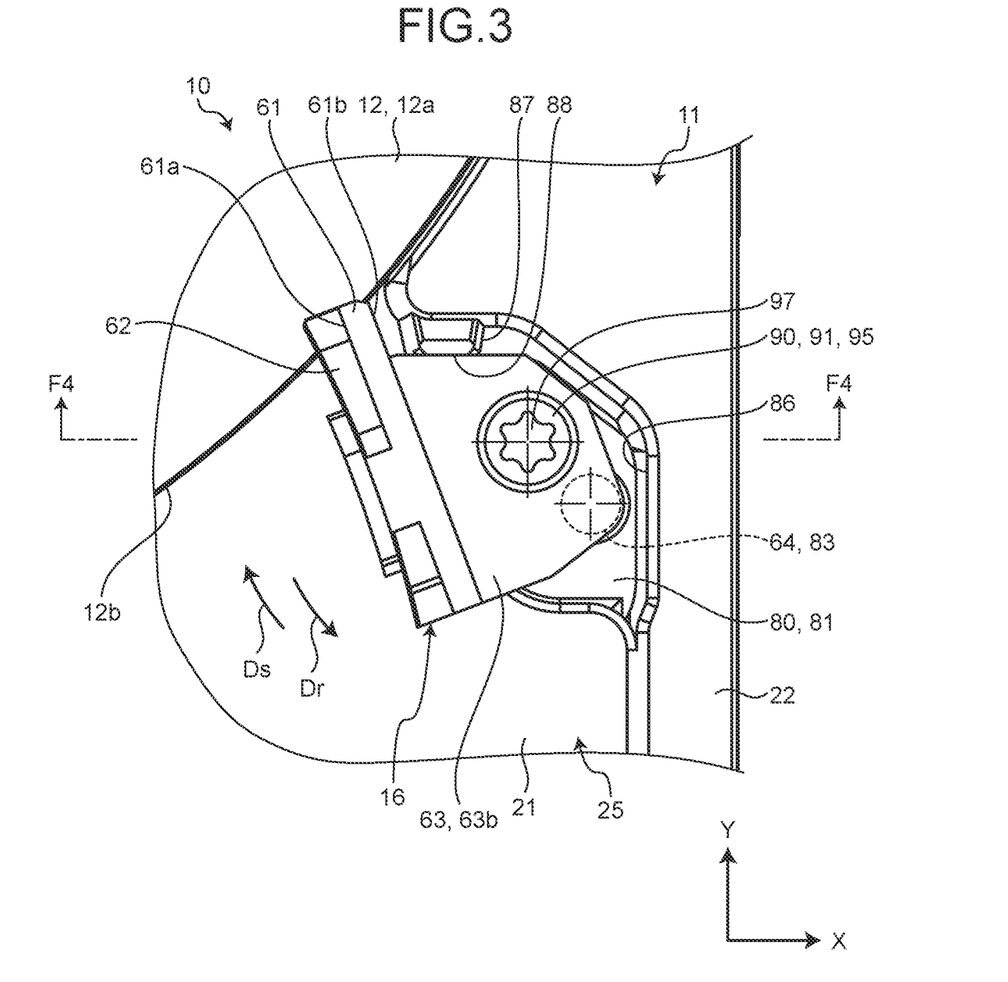
FIG. 3 is an exemplary plan view illustrating a portion of the housing and the ramp mechanism of the first embodiment.
Figure 4:
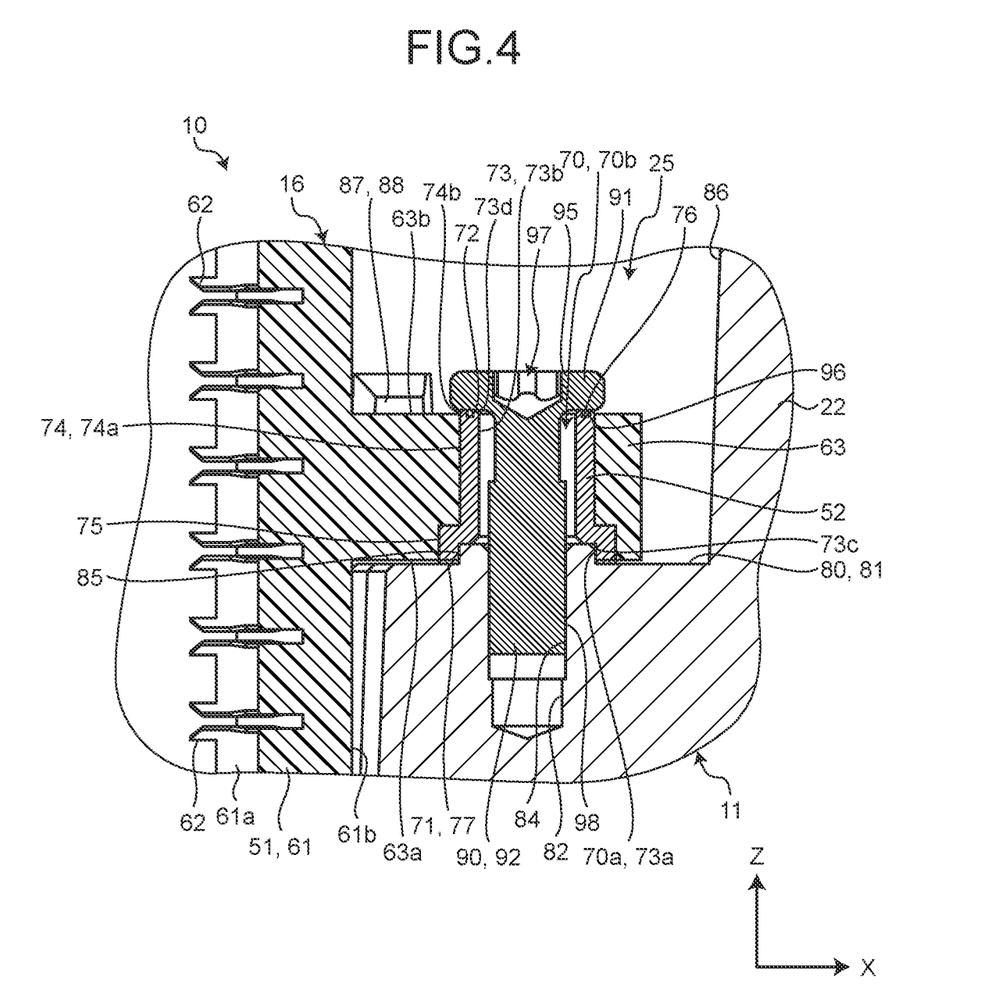
FIG. 4 is an exemplary cross-sectional view illustrating a portion of the HDD of the first embodiment taken along line F4-F4 of FIG. 3.

FIG. 3 is an exemplary plan view illustrating a portion of the housing 11 and the ramp mechanism 16 of the first embodiment. FIG. 4 is an exemplary cross-sectional view illustrating a portion of the HDD 10 of the first embodiment taken along line F4-F4 of FIG. 3. As illustrated in FIG. 4, the ramp mechanism 16 includes a ramp body 51 and a sleeve 52. The ramp body 51 is an example of a ramp member and may also be referred to as a resin part. The sleeve 52 is an example of a cylindrical member and may also be referred to as a metal part.

The ramp body 51 is made of, for example, synthetic resin. The ramp body 51 may be made of another material. As illustrated in FIG. 3, the ramp body 51 includes a base wall 61, a plurality of holding protrusions 62, an attachment tab 63, and a pin 64.

The base wall 61 has a plate shape extending substantially in the Z direction. The base wall 61 includes two side surfaces 61a and 61b facing in a direction substantially orthogonal to the Z direction. The side surface 61a faces the second rotation axis Ax2. The side surface 61b is opposite the side surface 61a.

The plurality of holding protrusions 62 protrude from the side surface 61a of the base wall 61. The plurality of holding protrusions 62 is provided corresponding to the HGAs 32. Therefore, the plurality of holding protrusions 62 are arranged at intervals in the Z direction. The corresponding magnetic disk 12 is disposed in a gap between two of the plurality of holding protrusions 62.

The holding protrusion 62 is positioned near the outer edge 12b of the magnetic disk 12. The holding protrusion 62 covers a portion of the recording surface 12a. The holding protrusion 62 can hold the distal end of the load beam 46 at a position separated from the outer edge 12b in the direction orthogonal to the first rotation axis Ax1. Note that the holding protrusion 62 may hold the distal end of the load beam 46 inside the outer edge 12b in the direction orthogonal to the first rotation axis Ax1.

The distal end of the load beam 46 is held by the holding protrusion 62 as described above when the magnetic head 42 does not read or write information from or to the magnetic disk 12 (during unloading). At this time, the magnetic head 42 is disposed at a position separated from the outer edge 12b of the magnetic disk 12 in the direction orthogonal to the first rotation axis Ax1. Note that the position of the HGA 32 at the time of unloading is not limited to this example.

On the other hand, when the magnetic head 42 reads and writes information from and to the magnetic disk 12 (during loading), the distal end of the load beam 46 is basically located on the recording surface 12a of the magnetic disk 12 together with the magnetic head 42. Note that the position of the HGA 32 at the time of loading is not limited to this example.

The distal end of the load beam 46 moves between a region on the recording surface 12a and a position (home position) of being held by the holding protrusion 62 according to the rotation of the HSA 14. The suspension 41 and the magnetic head 42 move (rotate) about the second rotation axis Ax2 according to the rotation of the HSA 14.

As illustrated in FIG. 2, the HSA 14 and the suspension 41 included in the HSA 14 rotate (move) about the second rotation axis Ax2 between a load position Pl and an unload position Pu. The load position Pl and the unload position Pu are angles (positions) around the second rotation axis Ax2 where the HSA 14 extends.

During loading, the HSA 14 is located at the load position Pl. That is, while the HSA 14 is located at the load position Pl, the magnetic head 42 is located on the recording surface 12a of the magnetic disk 12. Note that the load position Pl is not limited to one position and may be a plurality of positions where the magnetic head 42 is located on the recording surface 12a.

During unloading, the HSA 14 is located at the unload position Pu. That is, while the HSA 14 is located at the unload position Pu, the distal end of the load beam 46 of the suspension 41 is held by the holding protrusion 62 of the ramp body 51 so as to allow the magnetic head 42 to be away from the recording surface 12a.

As illustrated in FIG. 4, the attachment tab 63 protrudes from the side surface 61b of the base wall 61. The attachment tab 63 has, for example, a plate shape along the X-Y plane. Note that the shape of the attachment tab 63 is not limited to this example.

The attachment tab 63 includes a lower surface 63a and an upper surface 63b. Note that the upper and lower parts in the present specification are used for convenience based on the arrangement of FIG. 4 and do not limit the position, direction, and use mode. The lower surface 63a is substantially flat and faces in the −Z direction. The upper surface 63b is opposite the lower surface 63a. The upper surface 63b is substantially flat and faces in the +Z direction. The pin 64 illustrated in FIG. 3 has a substantially columnar shape and protrudes from the lower surface 63a in a substantially −Z direction.

The sleeve 52 illustrated in FIG. 4 is made of metal such as stainless copper, for example. Thus, the ramp body 51 is lower in Young's modulus than the sleeve 52. The sleeve 52 may be made of another material.

The sleeve 52 has a substantially cylindrical shape extending in the Z direction. The sleeve 52 is provided with a through hole 70 extending in the Z direction. The through hole 70 has a circular cross section. The sleeve 52 includes a first end surface 71, a second end surface 72, an inner surface 73, an outer surface 74, and a flange 75.

The first end surface 71 is an end surface of the sleeve 52 in the −Z direction. The first end surface 71 is a substantially circular flat surface and faces in the −Z direction. The second end surface 72 is an end surface of the sleeve 52 in the +Z direction. That is, the second end surface 72 is opposite the first end surface 71. The second end surface 72 is a substantially circular flat surface and faces in the +Z direction. One end of the through hole 70 is open to the first end surface 71. The other end of the through hole 70 is open to the second end surface 72.

The through hole 70 includes a housing part 70a and an insertion part 70b. The housing part 70a is one part of the through hole 70 and opens to the first end surface 71. The insertion part 70b is the other part of the through hole 70 and opens to the second end surface 72. The housing part 70a and the insertion part 70b communicate with each other. The housing part 70a has a larger cross-sectional area than the insertion part 70b. In other words, the through hole 70 has a larger diameter in the housing part 70a than in the insertion part 70b.

The inner surface 73 is a substantially cylindrical curved surface that forms, defines, or partitions the through hole 70. The inner surface 73 includes a first inner peripheral surface 73a, a second inner peripheral surface 73b, a bottom surface 73c, and an inner tapered surface 73d.

The first inner peripheral surface 73a is a substantially cylindrical curved surface extending in the substantially +Z direction from the first end surface 71 and forms the housing part 70a. The diameter of the first inner peripheral surface 73a is substantially constant. There may be another part between the first end surface 71 and the first inner peripheral surface 73a.

The second inner peripheral surface 73b is a substantially cylindrical curved surface extending in the substantially Z direction and forms the insertion part 70b. The diameter of the second inner peripheral surface 73b is substantially constant. Therefore, the diameter of the second inner peripheral surface 73b is smaller than the diameter of the first inner peripheral surface 73a.

The bottom surface 73c is provided between an end of the first inner peripheral surface 73a in the +Z direction, and an end of the second inner peripheral surface 73b in the −Z direction. The bottom surface 73c is substantially flat and faces substantially in the −Z direction. The bottom surface 73c forms a bottom of the housing part 70a.

The inner tapered surface 73d is a conical curved surface connected to the second end surface 72 and tapering in the −Z direction toward the first end surface 71. In other words, the inner tapered surface 73d is a substantially conical concave surface recessed from the second end surface 72. An end of the inner tapered surface 73d in the −Z direction is connected to an end of the first inner peripheral surface 73a in the +Z direction.

The outer surface 74 is opposite the inner surface 73. The outer surface 74 includes an outer peripheral surface 74a and an outer tapered surface 74b. The outer peripheral surface 74a is a substantially cylindrical curved surface extending substantially in the Z direction. The outer peripheral surface 74a has a substantially constant diameter. The outer tapered surface 74b is a conical curved surface connected to the second end surface 72 and tapering in the +Z direction toward the second end surface 72. An end of the outer tapered surface 74b in the −Z direction is connected to an end of the outer peripheral surface 74a in the +Z direction.

The flange 75 protrudes from an end of the outer peripheral surface 74a in the −Z direction. Thus, the flange 75 is spaced from the second end surface 72 in the −Z direction. The flange 75 extends on the entire outer peripheral surface 74a around the through hole 70. The flange 75 may be divided by, for example, a cutout. The end surface of the flange 75 in the −Z direction forms a part of the first end surface 71 of the sleeve 52. In other words, the flange 75 includes a part of the first end surface 71.

The second end surface 72 is provided with at least one groove 76. The groove 76 has an annular shape surrounding the through hole 70. Specifically, the groove 76 is concentric with the through hole 70, the first end surface 71, the second end surface 72, the inner surface 73, and the outer surface 74. The second end surface 72 may be provided with a plurality of grooves 76 concentric with each other.

The first end surface 71 is larger in size than the second end surface. In the present embodiment, the outer diameter of the first end surface 71 is enlarged by the flange 75. The first end surface 71 is larger in outer diameter than the second end surface 72. The inner diameter of the first end surface 71 is enlarged by the housing part 70a of the through hole 70. The first end surface 71 is larger in inner diameter than the second end surface 72.

The difference (width) between the inner diameter and the outer diameter in the first end surface 71 may be equal to or less than the difference (width) between the inner diameter and the outer diameter in the second end surface 72. In the present embodiment, since the outer diameter of the first end surface 71 is large, the length (circumference) of the first end surface 71 around the through hole 70 becomes long, and the area of the first end surface 71 becomes large. Further, the groove 76 reduces the area of the second end surface 72.

The first end surface 71 is formed, for example, of a coating 77 applied to the sleeve 52 made of metal. The coating 77 is made of, for example, metal or a synthetic resin that can exert larger friction than the metal sleeve 52. That is, the first end surface 71 and the second end surface 72 are made of different materials. The second end surface 72 may be formed of a coating that can reduce friction, or the first end surface 71 and the second end surface 72 may be made of the same material.

The first end surface 71 is greater in surface roughness than the second end surface 72. For example, the surface roughness of the first end surface 71 is increased by roughening. The surface roughness of the second end surface 72 may be reduced by polishing, or the surface roughness of the first end surface 71 may be equal to or less than the surface roughness of the second end surface 72.

The sleeve 52 is integrated with the ramp body 51 by, for example, insert molding. That is, the sleeve 52 is embedded into the ramp body 51 for fixation. The sleeve 52 may be fixed to the ramp body 51 by another method.

The sleeve 52 is closer to the magnetic disk 12 than the pin 64. In other words, the distance between the sleeve 52 and the magnetic disk 12 is shorter than the distance between the pin 64 and the magnetic disk 12. The sleeve 52 is closer to the base wall 61 and the holding protrusion 62 than the pin 64. Note that the position of the sleeve 52 is not limited to this example.

A portion of the sleeve 52 slightly protrudes in the −Z direction from the lower surface 63a of the attachment tab 63. Thus, the first end surface 71 is exposed to the outside of the ramp body 51. Another portion of the sleeve 52 slightly protrudes in the +Z direction from the upper surface 63b of the attachment tab 63. Thus, the second end surface 72 is exposed to the outside of the ramp body 51. The lower surface 63a and the first end surface 71 may form the same plane, or the upper surface 63b and the second end surface 72 may form the same plane.

The housing 11 further includes a support base 80. The support base 80 protrudes from the bottom wall 21 in the +Z direction and is connected to the peripheral wall 22. The support base 80 includes a first support surface 81. The first support surface 81 is substantially flat and faces in the +Z direction. The first support surface 81 contacts the first end surface 71 to support the sleeve 52.

The first support surface 81 is provided with a screw hole 82 and a hole 83 illustrated in FIG. 3. In other words, the screw hole 82 and the hole 83 are provided in the support base 80 and open on the first support surface 81. The screw hole 82 is closer to the magnetic disk 12 than the hole 83.

The screw hole 82 and the hole 83 each have a circular cross section and are recessed substantially in the −Z direction from the first support surface 81. That is, the screw hole 82 and the hole 83 extend substantially in parallel. The screw hole 82 and the hole 83 are bottomed holes and do not penetrate the housing 11. As illustrated in FIG. 4, the screw hole 82 is provided with a female screw 84 on the inner peripheral surface.

The screw hole 82 communicates with the through hole 70. The axis of the screw hole 82 and the axis of the through hole 70 may coincide with each other or may be separated from each other. As illustrated in FIG. 3, the pin 64 is accommodated in the hole 83. The pins 64 and the holes 83 may be omitted.

As illustrated in FIG. 4, the support base 80 further includes a protrusion 85. The protrusion 85 protrudes from the first support surface 81. The protrusion 85 has an annular shape surrounding the screw hole 82. The inner surface of the protrusion 85 may form a part of the screw hole 82.

The protrusion 85 is accommodated in the housing part 70a of the through hole 70. There is a gap between the protrusion 85 and the first inner peripheral surface 73a. There is also a gap between the protrusion 85 and the bottom surface 73c. The protrusion 85 may at least partially contact with the first inner peripheral surface 73a and the bottom surface 73c. In addition, the housing part 70a and the protrusion 85 may be omitted.

As illustrated in FIG. 3, the peripheral wall 22 of the housing 11 includes an inner surface 86 and a support protrusion 87. The inner surface 86 faces in a direction substantially orthogonal to the Z direction or inclined. The inner surface 86 faces the inside of the inner chamber 25, for example, faces the attachment tab 63 of the ramp mechanism 16.

Since the support base 80 is connected to the peripheral wall 22, the inner surface 86 is connected to an edge of the first support surface 81. The ramp mechanism 16 including the attachment tab 63 is separated from the inner surface 86 of the peripheral wall 22. Further, the base wall 61 and the holding protrusion 62 of the ramp mechanism 16 are separated from the support base 80.

The support protrusion 87 protrudes from the inner surface 86 toward the attachment tab 63. The support protrusion 87 is closer to the magnetic disk 12 than the screw hole 82. The support protrusion 87 may be provided at another position. The support protrusion 87 includes a second support surface 88. The second support surface 88 faces in a direction substantially orthogonal or inclined to the Z direction. The second support surface 88 is in contact with the attachment tab 63.

As illustrated in FIG. 4, the HDD 10 further includes a screw 90. The screw 90 is made of metal such as stainless copper, for example. The screw 90 attaches the sleeve 52 of the ramp mechanism 16 to the support base 80 of the housing 11. The screw 90 includes a screw head 91 and a screw shaft 92.

The screw head 91 has a substantially columnar shape extending substantially in the Z direction. The screw head 91 includes an upper surface 95 and a lower surface 96. The upper surface 95 is substantially flat and faces substantially in the +Z direction. The upper surface 95 is provided with a hole 97 into which a protrusion of a screwdriver is inserted. The lower surface 96 is opposite the upper surface 95. The lower surface 96 is substantially flat and faces in the −Z direction.

The screw shaft 92 extends substantially in the −Z direction from about the center of the lower surface 96 of the screw head 91. In other words, the screw head 91 is located at the end of the screw shaft 92 in the +Z direction. The screw shaft 92 has a substantially columnar shape. The screw shaft 92 is provided with a male screw 98 on the outer peripheral surface. The outer diameter of the male screw 98 is shorter than the diameter of the insertion part 70b. The screw shaft 92 is fitted into the screw hole 82 of the support base 80 through the through hole 70. As a result, the male screw 98 of the screw shaft 92 and the female screw 84 of the screw hole 82 are engaged with each other.

The lower surface 96 of the screw head 91 is in contact with the second end surface 72. Thus, with the screw 90, the sleeve 52 is fixed to the support base 80 while being held between the first support surface 81 and the lower surface 96.

The ramp body 51 is spaced from the first support surface 81 and the screw head 91. The ramp body 51 may be partially or temporarily in contact, for example, with the first support surface 81 and the screw head 91.

For example, due to the first end surface 71 of a larger size than the second end surface 72, the contact area between the sleeve 52 and the housing 11 is larger than the contact area between the sleeve 52 and the screw head 91. The first end surface 71 may be smaller than the second end surface 72. In this case, for example, since the first inner peripheral surface 73a and the bottom surface 73c are in contact with the protrusion 85, the contact area between the sleeve 52 and the housing 11 is larger than the contact area between the sleeve 52 and the screw head 91.

The static friction coefficient between the first end surface 71 and the first support surface 81 is set to greater than the static friction coefficient between the second end surface 72 and the screw head 91. That is, the static friction coefficient between the sleeve 52 and the housing 11 is larger than the static friction coefficient between the sleeve 52 and the screw head 91.

The screw shaft 92 is screwed into the screw hole 82 while being rotated in a screwing direction Ds around the screw shaft 92 illustrated in FIG. 3. The screwing direction Ds is a clockwise direction when the first support surface 81 is viewed in the −Z direction as illustrated in FIG. 3.

The second support surface 88 restricts the ramp mechanism 16 from rotating in the screwing direction Ds by contacting the attachment tab 63 of the ramp body 51. Further, the second support surface 88 restricts the ramp mechanism 16 from rotating clockwise about the pin 64 in FIG. 3.

To attach the above-described ramp mechanism 16 to the housing 11, the pin 64 is inserted into the hole 83, and the protrusion 85 is inserted into the housing part 70a. Next, the ramp mechanism 16 is rotated around the screw hole 82 or around the hole 83 so that the attachment tab 63 comes into contact with the second support surface 88.

While the attachment tab 63 is in contact with the second support surface 88, the screw shaft 92 of the screw 90 is inserted into the through hole 70 and fitted into the screw hole 82. The screw 90 is rotated in the screwing direction Ds until the lower surface 96 is in contact with the second end surface 72.

When the screw 90 is rotated in the screwing direction Ds, the screw shaft 92 is elastically deformed so as to be twisted in the screwing direction Ds. For example, when the screwdriver is removed from the hole 97, and the force acting on the screw 90 is released, the screw shaft 92 and the screw head 91 rotate in an opposite direction Dr to the screwing direction Ds due to restoration from elastic deformation.

Since the lower surface 96 is in contact with the second end surface 72, the screw head 91 applies a torque in the opposite direction Dr to the sleeve 52 of the ramp mechanism 16. However, the static frictional force between the first end surface 71 and the first support surface 81 exceeds the static frictional force between the second end surface 72 and the screw head 91. Therefore, the ramp mechanism 16 does not rotate in the opposite direction Dr, and the attachment tab 63 is maintained at a position in contact with the second support surface 88.

For example, the screw head 91 slides on the second end surface 72 and rotates in the opposite direction Dr, and the elastic deformation of the screw shaft 92 is eliminated. Note that the static frictional force between the second end surface 72 and the screw head 91 may keep the screw shaft 92 in a twisted state without rotating the screw head 91.

As described above, the ramp mechanism 16 is attached to the housing 11 at an accurate position to allow the attachment tab 63 to contact with the second support surface 88. Therefore, the distance between the ramp mechanism 16 and the HSA 14 is accurately set, and the unload position Pu is also accurately set. Note that the method of attaching the ramp mechanism 16 to the housing 11 is not limited to this example.

In the HDD 10 according to the first embodiment described above, the screw 90 fixes the ramp mechanism 16 to the housing 11 while holding the sleeve 52 between the screw head 91 and the first support surface 81 of the housing 11. When fixing the ramp mechanism 16 to the housing with the screw 90, the screw shaft 92 is elastically deformed in a twisted manner. When released from the applied force to the screw 90, the screw shaft 92 and the screw head 91 are rotated due to elastic recovery. The screw head 91 applies torque to the contacting sleeve 52. However, in the present embodiment, the contact area between the sleeve 52 and the housing 11 is set to larger than the contact area between the sleeve 52 and the screw head 91. This results in causing a larger frictional force between the housing 11 and the sleeve 52 than the torque applied to the sleeve 52 by the screw head 91, whereby the ramp mechanism 16 is not rotated but held. In this manner, the HDD 10 of the present embodiment can allow the threadably mounted ramp mechanism 16 to be maintained at a desired position.

According to the present embodiment, the static friction coefficient between the sleeve 52 and the housing 11 is set to larger than the static friction coefficient between the sleeve 52 and the screw head 91. Because of this, the frictional force between the housing 11 and the sleeve 52 exceeds the torque applied to the sleeve 52 by the screw head 91 even if the contact area between the sleeve 52 and the housing 11 is equal to or smaller than the contact area between the sleeve 52 and the screw head 91. As such, the HDD 10 can allow the threadably mounted ramp mechanism 16 to be maintained at a desired position.

With the ramp mechanism 16 maintained at a desired position, the unload position Pu can be accurately set. Thereby, the position at which the magnetic head 42 is away from the recording surface 12a can be accurately set. As a result, the HDD 10 can be avoided from decreasing in storage capacity.

Furthermore, the distance between the side surface 61a of the base wall 61 and the suspension 41 can be accurately set. As a result, the HDD 10 can prevent the suspension 41 from interfering with the side surface 61a, leading to preventing occurrence of such an event that the ramp body 51 is damaged by collision with the suspension 41 and its fragments contaminate the inside of the housing 11.

Further, the ramp mechanism 16 can be accurately positioned by the relative decrease in frictional force between the second end surface 72 and the screw head 91. As such, the HDD 10 can exclude a washer between the ramp mechanism 16 and the screw head 91, resulting in cost reduction.

The screw shaft 92 is screwed into the screw hole 82 while being rotated in the screwing direction Ds. The housing 11 includes the second support surface 88 that restricts the rotation of the ramp mechanism 16 in the screwing direction Ds by contacting the ramp body 51. That is, the ramp mechanism 16 can be positioned around the screw shaft 92 by contacting the second support surface 88. The screw head 91 of the screw 90, when released from the applied force in the screwing direction Ds, applies torque to the sleeve 52 in the opposite direction Dr to the screwing direction Ds. However, the frictional force between the housing 11 and the sleeve 52 exceeds the torque applied to the sleeve 52 by the screw head 91. Because of this, the HDD 10 according to the present embodiment can avoid the threadably mounted ramp mechanism 16 from being displaced from the second support surface 88 in the opposite direction Dr to the screwing direction Ds.

The sleeve 52 is embedded in the ramp body 51 such that the first end surface 71 and the second end surface 72 are exposed. The first support surface 81 contacts with the first end surface 71, and the screw head 91 contacts with the second end surface 72. The sleeve 52 held by the screw 90 has a higher Young's modulus than the ramp body 51. As a result, the HDD 10 of the present embodiment can avoid the ramp mechanism 16 from being deformed by the screw 90, ensuring that the ramp mechanism 16 is maintained at a desired position.

The first end surface 71 is larger in size than the second end surface 72. This can ensure that the contact area between the first end surface 71 and the first support surface 81 is set to larger than the contact area between the second end surface 72 and the screw head 91. As such, the HDD 10 of the present embodiment can allow the threadably mounted ramp mechanism 16 to be maintained at a desired position.

The sleeve 52 includes the inner surface 73 forming the through hole 70, the outer surface 74 opposite the inner surface 73, and the flange 75 protruding from the outer surface 74 and including at least a part of the first end surface 71. Such structure can ensure that the contact area between the first end surface 71 and the first support surface 81 is set to larger than the contact area between the second end surface 72 and the screw head 91. As such, the HDD 10 of the present embodiment can allow the threadably mounted ramp mechanism 16 to be maintained at a desired position. In addition, the flange 75 can be easily formed, for example, by cutting or pressing, facilitating forming of the sleeve 52.

The housing 11 further includes the protrusion 85 protruding from the first support surface 81 to surround the screw hole 82. The protrusion 85 is accommodated in the through hole 70. Thus, the ramp mechanism 16 can be positioned by the protrusion 85. Further, the contact between the protrusion 85 and the inner surface 73 of the sleeve 52 can increase the contact area between the sleeve 52 and the housing 11.

The first end surface 71 is made of a different material from that of the second end surface 72. The static friction coefficient between the first end surface 71 and the first support surface 81 is set to greater than the static friction coefficient between the second end surface 72 and the screw head 91. That is, the first end surface 71 is made of a material that increases the static friction coefficient. Because of this, at the time of elastic recovery of the screw shaft 92, the frictional force between the housing 11 and the sleeve 52 exceeds the torque applied to the sleeve 52 by the screw head 91, whereby the ramp mechanism is not rotated but held. In this manner, the HDD 10 of the present embodiment can allow the threadably mounted ramp mechanism 16 to be maintained at a desired position.

The first end surface 71 has a greater surface roughness than the second end surface 72. As a result, at the time of elastic recovery of the screw shaft 92, the frictional force between the housing 11 and the sleeve 52 exceeds the torque applied to the sleeve 52 by the screw head 91, whereby the ramp mechanism is not rotated but held. In this manner, the HDD 10 of the present embodiment can allow the threadably mounted ramp mechanism 16 to be maintained at a desired position.

The second end surface 72 is provided with the annular groove 76 surrounding the through hole 70. The groove 76 works to decrease the contact area between the second end surface 72 and the screw head 91. Further, the groove 76 extends in a direction that the screw head 91 is likely to rotate about the screw shaft 92 with respect to the second end surface 72. Due to such a groove, at the time of elastic recovery of the screw shaft 92, the frictional force between the first end surface 71 and the first support surface 81 exceeds the torque applied to the second support surface 88 by the screw head 91, whereby the ramp mechanism 16 is not rotated but held. In this manner, the HDD 10 of the present embodiment can allow the threadably mounted ramp mechanism 16 to be maintained at a desired position.

The inner surface 73 includes the inner tapered surface 73d that is connected to the second end surface 72 and tapers toward the first end surface 71. As a result, the second end surface 72 decreases in size, ensuring that the contact area between the first end surface 71 and the first support surface 81 is set to larger than the contact area between the second end surface 72 and the screw head 91. As such, the HDD 10 of the present embodiment can allow the threadably mounted ramp mechanism 16 to be maintained at a desired position. In addition, the inner tapered surface 73d can guide insertion of the screw shaft 92 into the through hole 70.

The outer surface 74 includes the outer tapered surface 74b that is connected to the second end surface 72 and tapers toward the second end surface 72. As a result, the second end surface 72 decreases in size, ensuring that the contact area between the first end surface 71 and the first support surface 81 is set to larger than the contact area between the second end surface 72 and the screw head 91. As such, the HDD 10 of the present embodiment can allow the threadably mounted ramp mechanism 16 to be maintained at a desired position.

The ramp body 51 is spaced from the first support surface 81 and the screw head 91. Thereby, the sleeve 52 stably contacts with the first support surface 81 and the screw head 91. This can ensure that the contact area between the first end surface 71 and the first support surface 81 is set to larger than the contact area between the second end surface 72 and the screw head 91.

Second Embodiment

Hereinafter, a second embodiment is described with reference to FIG. 5. In the following description of the plurality of embodiments, components having functions similar to those of the components already described are denoted by the same reference numerals as those of the components already described, and the description thereof may be omitted. In addition, the plurality of components denoted by the same reference numerals do not necessarily have all the functions and properties in common, and may have different functions and properties according to each embodiment.

Figure 5:
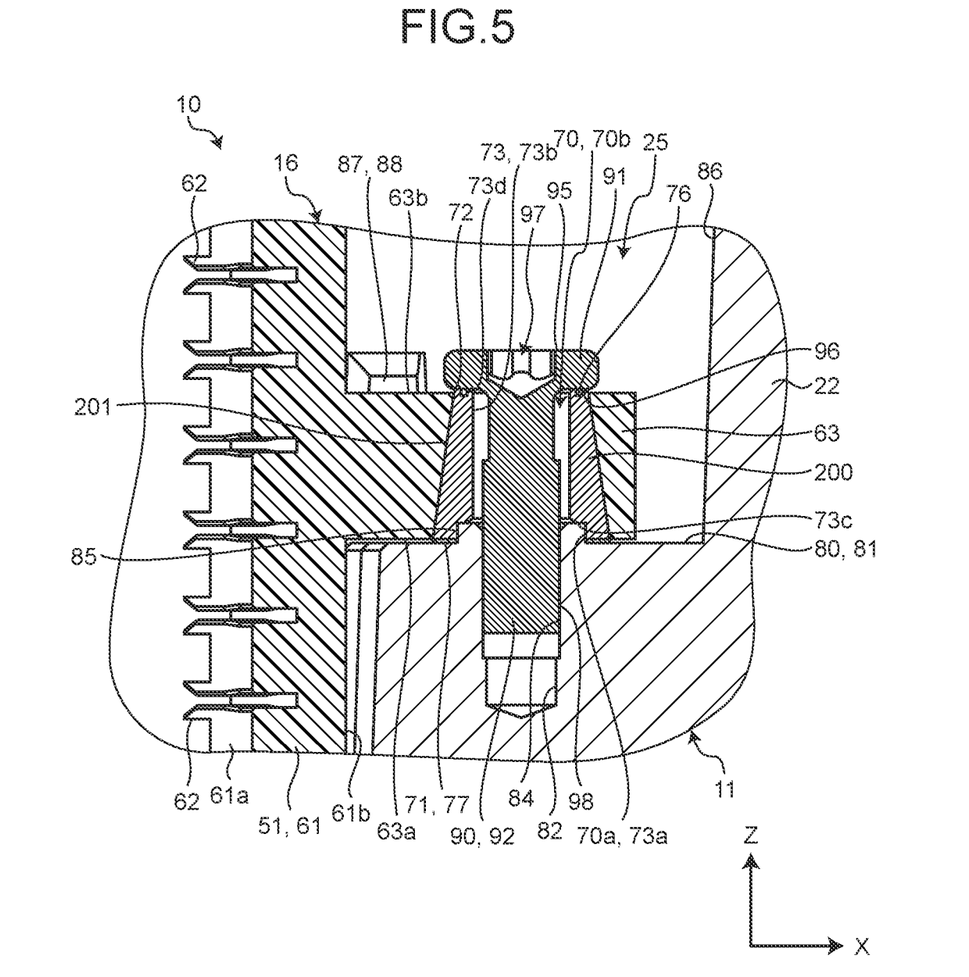
FIG. 5 is an exemplary cross-sectional view illustrating a portion of an HDD according to a second embodiment.

FIG. 5 is an exemplary cross-sectional view illustrating a portion of the HDD 10 according to a second embodiment. As illustrated in FIG. 5, the ramp mechanism 16 of the second embodiment includes a sleeve 200 instead of the sleeve 52. The sleeve 200 is substantially equal to the sleeve 52 except those described below.

The sleeve 200 includes an outer surface 201 instead of the outer surface 74 and the flange 75. The outer surface 201 is opposite the inner surface 73. The outer surface 201 is connected to the first end surface 71 and the second end surface 72.

The outer surface 201 tapers from the first end surface 71 toward the second end surface 72. In other words, the outer surface 201 has a greater diameter at the −Z directional end connected to the first end surface 71 than at the +Z directional end connected to the second end surface 72.

In the HDD 10 of the second embodiment described above, the sleeve 200 includes the inner surface 73 forming the through hole 70 and the outer surface 201 opposite the inner surface 73. The outer surface 201 tapers from the first end surface 71 toward the second end surface 72. Such structure can ensure that the contact area between the first end surface 71 and the first support surface 81 is set to larger than the contact area between the second end surface 72 and the screw head 91. Thereby, the HDD 10 of the present embodiment can allow the threadably mounted ramp mechanism 16 to be maintained at a desired position. Furthermore, the sleeve 200 gradually changing in thickness can be less deformable when applied with a load.

Third Embodiment

Figure 6:
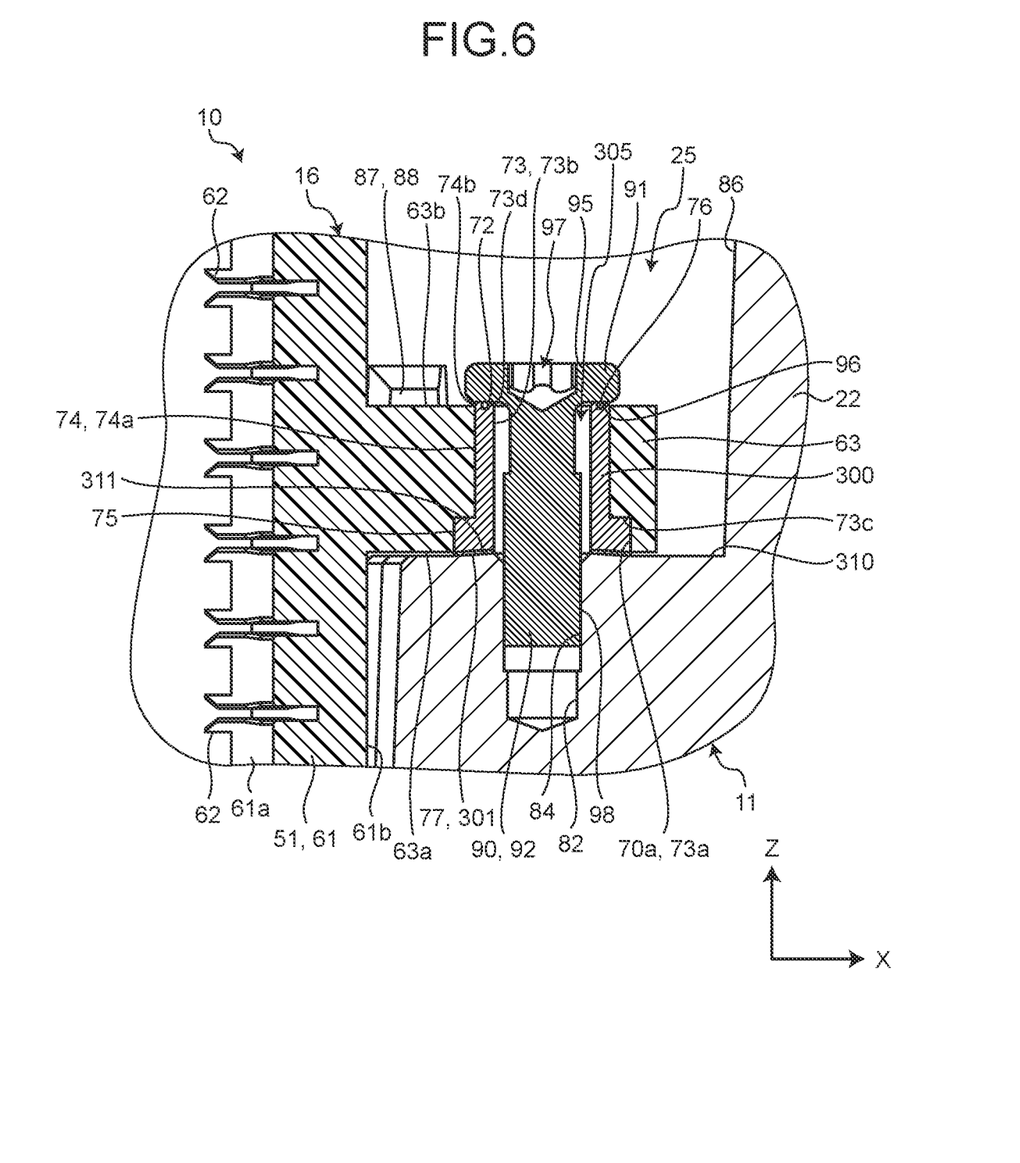
FIG. 6 is an exemplary cross-sectional view illustrating a portion of an HDD according to a third embodiment.

Hereinafter, a third embodiment is described with reference to FIG. 6. FIG. 6 is an exemplary cross-sectional view illustrating a portion of the HDD 10 according to the third embodiment. As illustrated in FIG. 6, the ramp mechanism 16 of the third embodiment includes a sleeve 300 instead of the sleeve 52. The sleeve 300 is substantially identical to the sleeve 52 except for the following points.

The sleeve 300 includes a first end surface 301 instead of the first end surface 71. The first end surface 301 is an end surface of the sleeve 300 in the −Z direction. The first end surface 301 has a conical shape tapering substantially in the +Z direction. In other words, the first end surface 301 is a conical concave surface that is recessed toward the second end surface 72.

The sleeve 300 is provided with a through hole 305 instead of the through hole 70. The inner surface 73 forms the through hole 305. The through hole 305 includes a circular cross section and extends in the Z direction. The diameter of the through hole 305 is substantially constant. The sleeve 300 of the third embodiment may have a housing part 70a and an insertion part 70b. One end portion of the through hole 305 opens to the first end surface 301, and the other end portion of the through hole 305 opens to the second end surface 72.

The housing 11 of the third embodiment includes a support base 310 instead of the support base 80. The support base 310 is substantially identical to the support base 80 except the following points. The support base 310 includes a first support surface 311. Meanwhile, the support base 310 does not have the protrusion 85.

The first support surface 311 has a conical shape tapering substantially in the +Z direction. That is, the first end surface 301 and the first support surface 311 taper in the same direction. The first end surface 301 and the first support surface 311 may have a conical shape tapering in the −Z direction.

The angle of the first end surface 301 with respect to the vertical direction is substantially equal to the angle of the first support surface 311 with respect to the vertical direction. That is, the first end surface 301 and the first support surface 311 are substantially parallel.

The first support surface 311 is in contact with the first end surface 301 and supports the sleeve 300. The first support surface 311 is provided with the screw hole 82. Meanwhile, the hole 83 is provided on the other substantially flat surface of the support base 310 facing in the +Z direction. Note that the hole 83 is not limited to this example.

In the HDD 10 of the third embodiment described above, the first end surface 301 and the first support surface 311 have a conical shape tapering in the same direction. As a result, the contact area between the first end surface 301 and the first support surface 311 of such a shape can be increased as compared with that between the first end surface 301 and the first support surface 311 being planes orthogonal to the screw shaft 92.

Consequently, the HDD 10 of the present embodiment can allow the threadably mounted ramp mechanism 16 to be maintained at a desired position. In addition, the first end surface 301 is pressed against the first support surface 311 to have the same center. In this manner, the ramp mechanism 16 can be positioned by the first end surface 301 and the first support surface 311.

In the third embodiment, the conical first end surface 301 and the first support surface 311 are in contact with each other. Thus, the first end surface and the first support surface are not limited to a plane. For example, unevenness may be provided on each of the first end surface and the first support surface, and the unevenness of the first end surface and the unevenness of the first support surface may be fitted to each other. In this case, the unevenness increases the contact area between the first end surface and the first support surface.

In the above description, "prevent" is defined as, for example, preventing the occurrence of an event, an action, or an influence, or reducing the degree of the event, the action, or the influence. Furthermore, in the above description, "restrict" is defined as, for example, preventing movement or rotation, or allowing movement or rotation within a predetermined range and preventing movement or rotation beyond the predetermined range.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A disk device comprising:
   a magnetic disk including a recording surface;
   a magnetic head configured to read and write information from and to the magnetic disk;
   a suspension configured to hold the magnetic head and to move between a load position where the magnetic head is located on the recording surface and an unload position where the magnetic head is located away from the recording surface;
   a ramp mechanism including
      a ramp member configured to hold the suspension at the unload position, and
      a cylindrical member with a through hole, being fixed to the ramp member;
   a housing including a first support surface with a screw hole supporting the cylindrical member, the housing accommodating the magnetic disk, the magnetic head, the suspension, and the ramp mechanism; and
   a screw including
      a screw head, and
      a screw shaft extending from the screw head to be fitted into the screw hole through the through hole,
   the screw holding the cylindrical member between the screw head and the first support surface,
   wherein a contact area between the cylindrical member and the housing is set to larger than a contact area between the cylindrical member and the screw head.

2. The disk device according to claim 1,
   wherein the screw shaft is screwed into the screw hole while being rotated around the screw shaft in a screwing direction, and
   the housing includes a second support surface that restricts the ramp mechanism from rotating in the screwing direction by contacting the ramp member.

3. The disk device according to claim 1,
   wherein the ramp member is lower in Young's modulus than the cylindrical member,
   the cylindrical member includes a first end surface to which a first end of the through hole is open, and a second end surface opposite the first end surface and to which a second end of the through hole is open,
   the cylindrical member is embedded in the ramp member such that the first end surface and the second end surface are exposed,
   the first support surface is in contact with the first end surface, and
   the screw head is in contact with the second end surface.

4. The disk device according to claim 3,
   wherein the first end surface is larger in size than the second end surface.

5. The disk device according to claim 3,
   wherein the cylindrical member includes:
   an inner surface forming the through hole,
   an outer surface opposite the inner surface, and
   a flange protruding from the outer surface and including at least a part of the first end surface.

6. The disk device according to claim 5,
   wherein the inner surface includes an inner tapered surface connected to the second end surface and tapering toward the first end surface.

7. The disk device according to claim 5,
   wherein the outer surface includes an outer tapered surface connected to the second end surface and tapering toward the second end surface.

8. The disk device according to claim 3,
   wherein the cylindrical member includes an inner surface forming the through hole, and an outer surface opposite the inner surface, and
   the outer surface tapers from the first end surface toward the second end surface.

9. The disk device according to claim 3,
wherein the housing further includes a protrusion that protrudes from the first support surface to surround the screw hole and be accommodated in the through hole.

10. The disk device according to claim 3,
wherein the first end surface is made of a different material from a material of the second end surface, and
a static friction coefficient between the first end surface and the first support surface is set to greater than a static friction coefficient between the second end surface and the screw head.

11. The disk device according to claim 3,
wherein the first end surface is larger in surface roughness than the second end surface.

12. The disk device according to claim 3,
wherein the second end surface is provided with an annular groove surrounding the through hole.

13. The disk device according to claim 3,
wherein the first end surface and the first support surface have a conical shape tapering in a same direction.

14. The disk device according to claim 3,
wherein the ramp member is spaced from the first support surface and the screw head.

15. A disk device comprising:
a magnetic disk including a recording surface;
a magnetic head configured to read and write information from and to the magnetic disk;
a suspension configured to hold the magnetic head and to move between a load position where the magnetic head is located on the recording surface and an unload position where the magnetic head is located away from the recording surface;
a ramp mechanism including
a ramp member configured to hold the suspension at the unload position, and
a cylindrical member with a through hole, being fixed to the ramp member;
a housing including a first support surface with a screw hole supporting the cylindrical member, the housing accommodating the magnetic disk, the magnetic head, the suspension, and the ramp mechanism; and
a screw including
a screw head, and
a screw shaft extending from the screw head to be fitted into the screw hole through the through hole,
the screw holding the cylindrical member between the screw head and the first support surface,
wherein a static friction coefficient between the cylindrical member and the housing is set to be larger than a static friction coefficient between the cylindrical member and the screw head.

* * * * *